J. FINN.
Marble Molding Machines.
No. 141,213.                               Patented July 29, 1873.
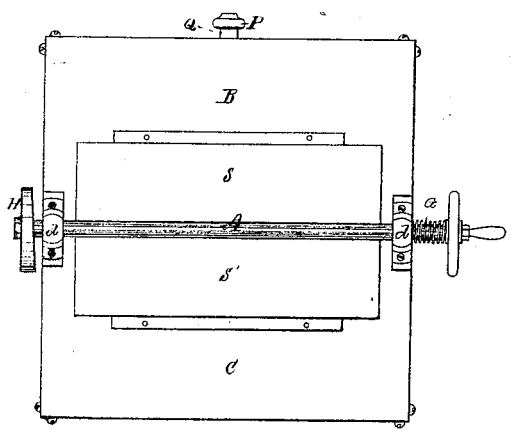
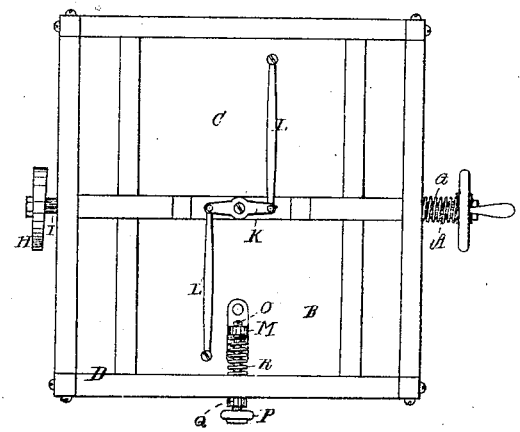
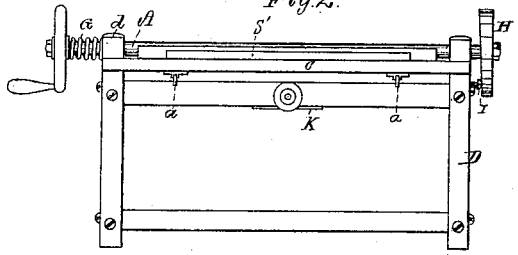
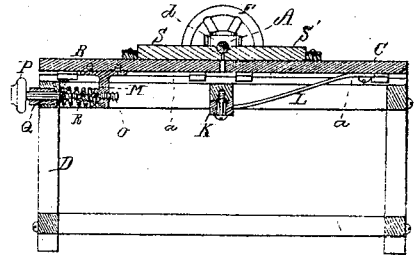
Witnesses.
S. N. Piper
L. N. Höller.
James Finn
by his attorney.

UNITED STATES PATENT OFFICE.

JAMES FINN, OF BOSTON, MASSACHUSETTS.

IMPROVEMENT IN MARBLE-MOLDING MACHINES.

Specification forming part of Letters Patent No. 141,213, dated July 29, 1873; application filed June 25, 1873.

*To all whom it may concern:*

Be it known that I, JAMES FINN, of Boston, of the county of Suffolk and State of Massachusetts, have invented a new and useful Machine for Molding Marble; and I do hereby declare the same to be fully described in the following specification and represented in the accompanying drawings, of which—

Figure 1 is a top view, Fig. 2 a front elevation, Fig. 3 a bottom view, and Fig. 4 a transverse section, of one of my improved machines for such purpose.

This machine has a rotary reciprocating grinder or cylindrical shaft, A, and two movable tables or platforms, B C, applied to a supporting-frame, D. The tables, arranged upon opposite sides of the grinder, are supported on parallel rails $a\ a$, so as to be capable of being moved rectilinearly either toward or away from the grinder, in order to properly present to it at one and the same time two marble or stone slabs, S S', for the purpose of having their inner edges simultaneously molded or reduced to "cavetto" by said rotary grinder. The grinder is supported in boxes $d\ d$ erected upon the frame at its middle, as shown, the same being so as to admit of the shaft being revolved on its axis, and at the same time moved longitudinally in either direction. Enveloping the shaft, and arranged against one of the boxes and a driving-wheel, F, contiguous thereto and fixed to the shaft, is a helical spring, G, there being fixed on the shaft, at its opposite end, a cam-wheel, H, having its cam or inclined side resting against a stud, I, projecting from the frame, in manner as represented.

On revolving the shaft or grinder the said cam-wheel and spring will effect, or aid in effecting, a reciprocating endwise motion of it.

Furthermore, at the middle of the frame, and underneath the shaft or grinder, there is a lever, K, pivoted at its center to the frame, such lever having jointed to its opposite arms two connecting-rods, L L', which extend in opposite directions from the lever and are pivoted to the two tables, all being as shown, From one of the tables there projects downward an arm, M, through which a screw, O, going through the front upper bar of the frame, is screwed. This screw, provided with a head, P, turns or slides in a stop or bearing, Q, projecting from the said bar of the frame; and there is around the screw and between the stop and the aforesaid arm M, and bearing against the tube or stop Q, a helical spring, R, all being arranged as shown.

By turning up the said screw O, while its head may be in contact with the stop Q, both of the tables will be moved simultaneously away from the grinder. On reversing the motion of the screw the spring, by its expansive power, will move the front table forward or toward the grinder, the other table being in the meantime so moved by the lever and connecting-rods. After the screw may have been turned backward so as to carry its head out of contact with the stop the spring will operate to keep the stones of the table in contact with the grinder, particularly as fast as such stones may be reduced by it.

A marble-molding machine recently patented by me, represented in the United States patent No. 138,079, and provided with two movable tables and a rotary and reciprocating grinder, constructed and arranged substantially as hereinbefore described, had each of its tables furnished with weights suspended from it and the main frame, so as to constantly draw the slab forward to the grinder, each table operating independently of the other.

In my present machine I have dispensed with such appliances, and adopted a mechanism for simultaneously operating from one side of the machine both beds, arresting them in any desirable positions within their ranges of motion and pressing their stones against the grinder, as occasion may require, this mechanism being capable of being thrown into or out of action by an attendant standing at one side of the machine, who, by simply revolving the screw in one direction, can cause both tables to move away simultaneously from the grinder; or who, by moving the screw in the other direction, can cause the tables to be moved simultaneously in the opposite direction by or through the aid of the single spring arranged upon such screw.

I therefore herein make no claim to the aforesaid machine shown in said patent No. 138,079; but

What I claim as my present invention is as follows—that is to say:

1. In combination with the reciprocating rotary grinder A and the two movable tables B C, arranged as explained, mechanism, substantially as described, for simultaneously operating from one side of the frame D both beds, as set forth, and arresting them in any desirable positions within their ranges of movement, such consisting of the screw O, the spring R, the arm M, the lever K, and the two connecting-rods L L', arranged together and applied to the tables and frame, substantially as described.

2. The combination of the screw O, the spring R, the arm M, the lever K, and the two connecting-rods L L', in their arrangement with the frame D and the tables B C of the grinder A, as specified.

JAMES FINN.

Witnesses:
R. H. EDDY,
J. R. SNOW.